United States Patent
Weinfield (10) Patent No.: US 10,771,119 B2
(45) Date of Patent: Sep. 8, 2020

(54) INTELLIGENT ANTENNA SYSTEM

(71) Applicants: DENSO International America, Inc., Southfield, MI (US); DENSO CORPORATION, Kariya, Aichi-pref. (JP)

(72) Inventor: Aaron Weinfield, Encinitas, CA (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/134,370

(22) Filed: Sep. 18, 2018

(65) Prior Publication Data

US 2020/0091969 A1 Mar. 19, 2020

(51) Int. Cl.
| | | |
|---|---|---|
| H04B 7/0404 | (2017.01) |
| H04W 4/44 | (2018.01) |
| H04W 4/02 | (2018.01) |
| H04W 4/20 | (2018.01) |
| H01Q 1/32 | (2006.01) |

(52) U.S. Cl.
CPC ............ *H04B 7/0404* (2013.01); *H04W 4/44* (2018.02); *H01Q 1/3233* (2013.01); *H04W 4/027* (2013.01); *H04W 4/20* (2013.01)

(58) Field of Classification Search
CPC .............................. H04B 7/0404; H04W 4/44
See application file for complete search history.

(56) References Cited

U.S. PATENT DOCUMENTS

| | | | |
|---|---|---|---|
| 9,306,639 | B2 | 4/2016 | Burchard et al. |
| 9,401,090 | B2 | 7/2016 | Mochizuki |
| 2012/0115553 | A1 | 5/2012 | Mahe et al. |
| 2014/0274182 | A1* | 9/2014 | Menzel ................ H04B 7/0871 455/509 |
| 2017/0201299 | A1* | 7/2017 | Nammi ................ H04B 7/0478 |
| 2017/0339441 | A1* | 11/2017 | Kuhlmann ............ H04B 7/0837 |
| 2018/0004933 | A1* | 1/2018 | Nathanson .............. H04W 4/44 |

* cited by examiner

*Primary Examiner* — Muthuswamy G Manoharan
(74) *Attorney, Agent, or Firm* — Harness, Dickey & Pierce, P.L.C.

(57) ABSTRACT

A vehicle communications system includes a pair of antennas, a radio, and a controller. The controller is configured to enable and disable antenna diversity between communication over a safety channel and communication over a service channel.

16 Claims, 7 Drawing Sheets

INTELLIGENT ANTENNA SYSTEM

FIELD

The present disclosure relates to vehicle communication systems and, more specifically, to a system and method of intelligent antenna selection for supporting vehicle-to-vehicle (V2V) and other communications.

BACKGROUND

This section provides background information related to the present disclosure which is not necessarily prior art.

Vehicle to vehicle (V2V), vehicle to infrastructure (V2I), vehicle-to-pedestrian (V2P), vehicle-to-network (V2N), collectively referred to as vehicle-to-everything (V2X), technology relies on vehicles transmitting Basic Safety Messages (BSMs) over a vehicle communications radio, for example a dedicated short range communications (DSRC) radio, a cellular-V2X (C-V2X) radio, or any other communications radio, to all other surrounding vehicles in the vicinity. The SAE J2945/1 document defines the rules to be used when transmitting BSMs.

Message reception is critical to the operation of V2V/V2X safety applications. In DSRC systems, for example, the messages are sent and received using 5.9 GHz DSRC communications which are sent through a 5.9 GHz DSRC antenna. In C-V2X based systems, the message are sent and received using 5G C-V2X communications sent through a cellular antenna.

Road side equipment (RSE) may be installed at intersections (or other locations) to facilitate V2X safety by transmitting information to vehicles about traffic signal status via Signal Phase & Timing (SPAT) and Map messages. Another use of RSE's is to provide a method of the V2X Onboard Equipment (OBE) to communicate to servers on the internet via DSRC.

SUMMARY

This section provides a general summary of the disclosure, and is not a comprehensive disclosure of its full scope or all of its features.

An example vehicle communications system according to the present disclosure includes a pair of antennas, a radio, and a controller. The controller is configured to enable and disable antenna diversity between communication over a safety channel and communication over a service channel.

In an embodiment, the controller may be configured to enable and disable antenna diversity based on vehicle speed, vehicle location, service priority, or a combination thereof.

In an embodiment, the controller may be configured to transfer data over the service channel to a server.

In an embodiment, the controller may be configured to communicate with an infrastructure over the service channel.

In an embodiment, the controller may be configured to communicate with a remote vehicle over the safety channel.

In an embodiment, the controller may be configured to determine whether a vehicle speed is greater than a threshold and to enable antenna diversity for the radio if the vehicle speed is greater than the threshold.

In an embodiment, the controller may be configured to compare a vehicle speed with a threshold, analyze a WAVE Service Advertisement message, determine whether the WAVE Service Advertisement message offers a service that is needed, and disable antenna diversity for the radio if the vehicle speed is less than or equal to the threshold and the WAVE Service Advertisement message is needed.

In an embodiment, when antenna diversity is enabled, the radio may be restricted to communication over the safety channel.

In an embodiment, when antenna diversity is disabled, one of the pair of antennas may communicate over the safety channel and one of the pair of antennas may communicate over the service channel.

In an embodiment, the system may include a second radio. When antenna diversity is disabled a first of the pair of antennas and the radio may communicate over the safety channel and a second of the pair of antennas and the second radio may communicate over the service channel.

An example method for vehicle communication according to the present disclosure includes determining, by a controller, current vehicle conditions; and enabling and disabling, by the controller, antenna diversity for a radio between communication over a safety channel and communication over a service channel based on the current vehicle conditions.

In an embodiment, the method may further include enabling and disabling, by the controller, antenna diversity based on vehicle speed, vehicle location, service priority, or a combination thereof.

In an embodiment, the method may further include transferring, by the controller, data over the service channel to a server.

In an embodiment, the method may further include communicating, by the controller, with an infrastructure over the service channel.

In an embodiment, the method may further include communicating, by the controller, with a remote vehicle over the safety channel.

In an embodiment, the method may further include determining, by the controller, whether a vehicle speed is greater than a threshold; and enabling, by the controller, antenna diversity for the radio if the vehicle speed is greater than the threshold.

In an embodiment, the method may further include comparing, by the controller, a vehicle speed with a threshold; analyzing, by the controller, a WAVE Service Advertisement message; determining, by the controller, whether the WAVE Service Advertisement message offers a service that is needed; and disabling, by the controller, antenna diversity for the radio if the vehicle speed is less than or equal to the threshold and the WAVE Service Advertisement message is needed.

In an embodiment, the method may further include restricting, by the controller, the radio to communication over the safety channel when antenna diversity is enabled.

In an embodiment, the method may further include configuring, by the controller, a first antenna to communicate over the safety channel and a second antenna to communicate over the service channel when antenna diversity is disabled.

In an embodiment, the method may further include configuring, by the controller, a first antenna and the radio to communicate over the safety channel and a second antenna and a second radio to communicate over the service channel when antenna diversity is disabled.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module," the term "unit," or the term "controller" may be replaced with the term "circuit." The term "module" or the term "unit" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module or unit may include one or more interface circuits. In some examples, the interface circuits may include wired or wireless interfaces that are connected to a local area network (LAN), the Internet, a wide area network (WAN), or combinations thereof. The functionality of any given module or unit of the present disclosure may be distributed among multiple modules or units that are connected via interface circuits. For example, multiple modules or units may allow load balancing. In a further example, a server (also known as remote, or cloud) module or unit may accomplish some functionality on behalf of a client module or unit.

The term code, as used above, may include software, firmware, and/or microcode, and may refer to programs, routines, functions, classes, data structures, and/or objects. The term shared processor circuit encompasses a single processor circuit that executes some or all code from multiple modules or units. The term group processor circuit encompasses a processor circuit that, in combination with additional processor circuits, executes some or all code from one or more modules or units. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules or units. The term group memory circuit encompasses a memory circuit that, in combination with additional memories, stores some or all code from one or more modules or units.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

Dedicated Short Range Communication (DSRC) V2X technology relies on vehicle periodically transmitting a Basic Safety Message (BSM) containing the vehicle's current 3D position (latitude, longitude, and elevation), speed, heading, brake and turn signal status, and other vehicle information on a single channel dedicated for the BSM and other defined messages. With V2X technology, vehicles can have improved safety by knowing more about other surrounding vehicles. Safety applications within each vehicle use local Host Vehicle (HV) information and the received BSM information from Remote Vehicles (RV) to predict potential collision situations. The BSM is transmitted on a single, pre-defined DSRC channel referred to as the "safety channel," so it is necessary for each vehicle to always have a DSRC radio tuned to the safety channel so it can reliably receive BSMs from surrounding vehicles and transmit BSMs to those surrounding vehicles.

Road Side Equipment (RSE) may be installed at intersections (or other locations) to facilitate V2X safety by transmitting information to vehicles about traffic signal status via Signal Phase & Timing (SPAT) and Map messages. Another use for the RSEs is to provide a method for the V2X Onboard Equipment (OBE) to communicate to servers on the internet via DSRC. In some examples, the RSE may transmit WAVE Service Advertisement (WSA) Messages to advertise Internet Protocol version 6 (IPv6) connectivity, and the OBE may establish an IPv6 connection to the desired server on the Internet when desired. One example of a server is the Security Credential Management System (SCMS), used to provision and maintain security certificates on the OBEs.

DSRC radios may support one or two (1 or 2) antennas, which is referred to as transmit and/or receive antenna diversity when multiple antennas are used concurrently. Using multiple antennas improves the reliability of messages being received and therefore increases the system effectiveness and improves safety.

If the V2X OBE installed in a vehicle contains multiple DSRC radios, each radio must have at least one antenna to operate. If an OBE supports 2 DSRC radios and 2 antennas, then both antennas can be allocated to the same DSRC radio or each antenna can be allocated to a separate radio. There may be situations where it can be advantageous to dynamically change the antenna allocation so safety can be maximized when needed, while still getting good usage out of the second radio when needed.

A system and methods are described herein that determines when it is most advantageous to configure the antennas for diversity mode and when it is advantageous to switch to non-diversity mode as it relates to improving V2V safety and ensuring adequate communication with an RSE.

In one example, the OBE V2X equipment contains 2 DSRC radios and 2 antennas. Radio 1 may be used as a dedicated radio to transmit/receive BSMs on the safety channel. Radio 1 may also receive WSAs from an RSE on the safety channel. Upon reception of the WSA, the OBE may tune radio 2 to a different channel so it can upload or download data via the RSE to a server. The communication to the RSE is done in an area within the vehicle facility in which V2V safety is not the primary concern. But, while driving on public roads, V2V safety may be the primary concern. In this example, the usage of antenna diversity for antenna 1 may be employed while on public roads, but, when in communication with the RSE, antenna diversity may be disabled so data can be uploaded/downloaded between the OBE and RSE.

Figure 1A:
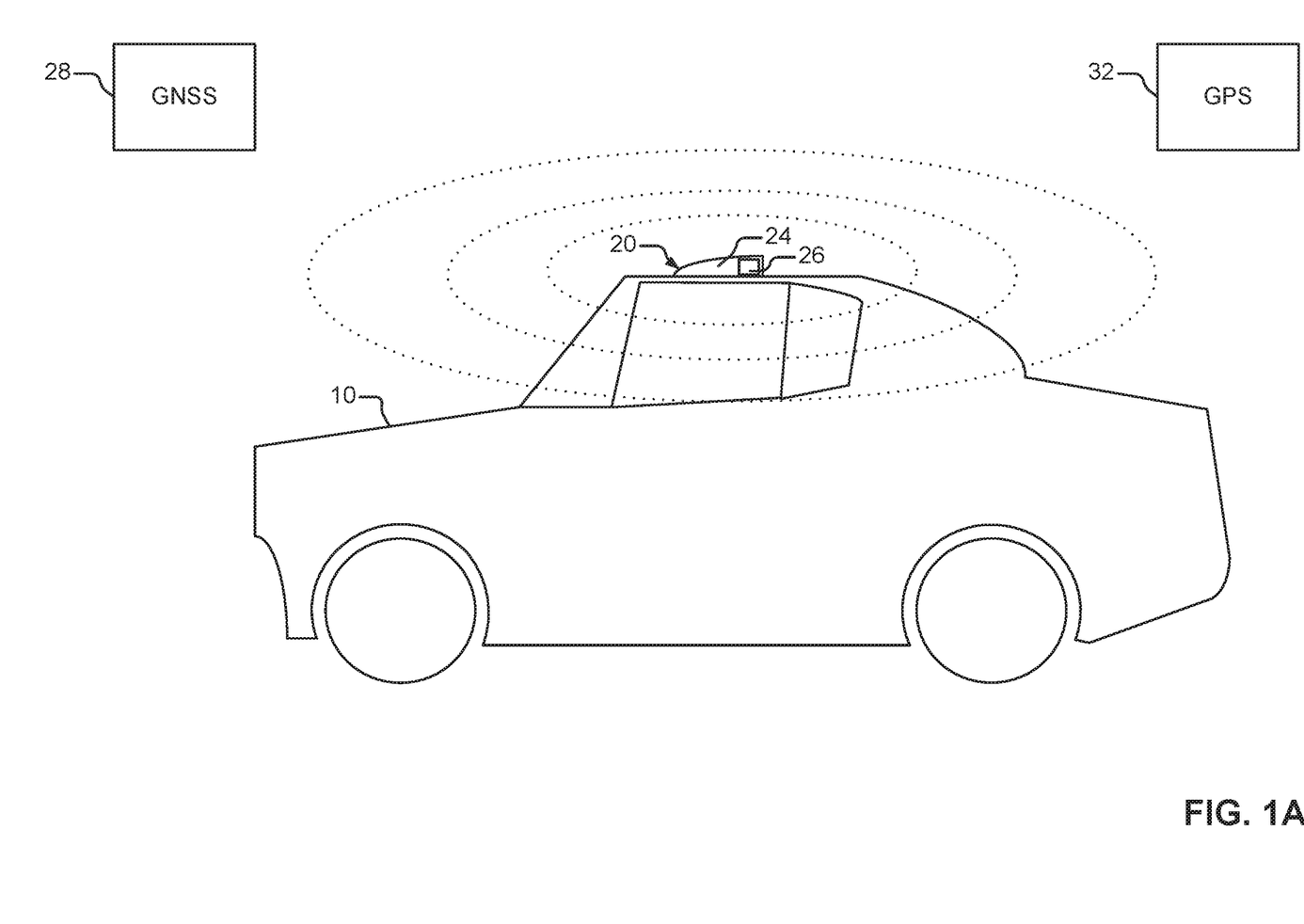
FIG. 1A is an illustration of a vehicle including a vehicle communications system according to the present disclosure.

Now, referring to FIG. 1A, a vehicle 10, or host vehicle (HV), having vehicle to vehicle (V2V), vehicle to infrastructure (V2I), vehicle to pedestrian (V2P), and vehicle to network (V2N), collectively referred to as vehicle to everything (V2X), safety technology is shown. In the example embodiment, a vehicle, or host vehicle, 10 is equipped with at least one vehicle communications system (for example only, a dedicated short range communication (DSRC) system or a cellular-V2X (C-V2X) system) 20 having various V2X onboard equipment (OBE). While the vehicle 10 is described as being equipped with at least one DSRC system or a C-V2X system, in other embodiments, the vehicle 10 may be equipped with any vehicle communications system utilizing an antenna for transmitting information.

The vehicle communications system 20 may be configured to transmit and receive signals representing, for example, early warnings of accidents and driving hazards to/from remote vehicles that are also equipped with V2X systems and/or to/from an infrastructure communication location equipped with a V2X system. Additionally, the vehicle communications system 20 may be configured to predict future accidents and driving hazards based on communication with remote vehicles and/or infrastructure communication locations that are also equipped with V2X systems by calculating the current and future positions of the vehicle 10.

The OBE of the vehicle communications system 20 may include at least one antenna 24 (for example only, a 5.9 GHz DSRC antenna, a 5G cellular antenna, or any other communications antenna) and at least one radio 26. In the vehicle communications system 20, there may be at least one antenna 24 for each radio 26. The antenna 24 may receive information from Global Network Satellite Systems (GNSS) 28 and/or Global Positioning Systems (GPS) 32, which communicate with the vehicle communications system 20, along with Basic Safety Messages (BSM) periodically transmitted by other vehicles, infrastructure, pedestrians, networks, etc., containing the current position, position accuracy, speed, heading, brake status, and other vehicle infrastructure, pedestrian, network, etc., information. The SAE J2735 document defines the BSMs that may be utilized and the frequency and power with which the BSMs are transmitted. With V2X technology, vehicles can have improved safety by knowing more about the other surrounding vehicles, infrastructure, pedestrians, etc. For example only, the vehicle communications system 20 may include two antennas 24 and two DSRC, C-V2X, or other communications radios 26.

While the communications antenna is illustrated and described as being disposed on a vehicle body, the present disclosure is applicable to V2X antennas on vehicles, infrastructure, or any other V2X antenna location. Additionally, while the antenna is described as communicating with a remote vehicle (RV) or an infrastructure, it is understood that this is for example purposes only and the antenna could be communicating with any remote message-sending antenna, including a remote pedestrian, etc.

The vehicle communications system(s) 20 may communicate with the other vehicles, infrastructure, pedestrians, networks, etc., equipped with a V2X system, for example, through the antenna(s) 24 by using, for example, a 75 MHz band around a 5.9 GHz signal. While a 75 MHz band around a 5.9 GHz signal is provided as an example embodiment, it is understood that the vehicle communications system(s) 20 may communicate with the other vehicles, pedestrians, infrastructures, networks, etc., by any method including at signals other than the 5.9 GHz signal, such as with a 5G cellular signal or any other communications signal. All of the components of the vehicle communications system(s) 20 may be located at one or multiple locations on the roof of the vehicle. Alternatively, some of the components may be located in the interior of the vehicle 10. While the vehicle communications system(s) 20 are illustrated as being located on the roof of the vehicle 10, in some embodiments, the vehicle communications system(s) 20, and any or all of the components, may be disposed at any location on the vehicle 10 to include the front, rear, sides, and internal to the vehicle 10.

The vehicle communications system(s) 20 may communicate with other vehicles, infrastructure, pedestrians, networks, etc., over one or more channels. For example, the channels may include a safety channel, one or more service channels, and any other communication channels. In some embodiments where the vehicle 10 includes at least two vehicle communications systems 20, one communications system 20 may be dedicated to the safety channel at all times and the second communications system 20 may be dynamically tuned to either the safety channel or a designated service, or other, channel.

Figure 1B:
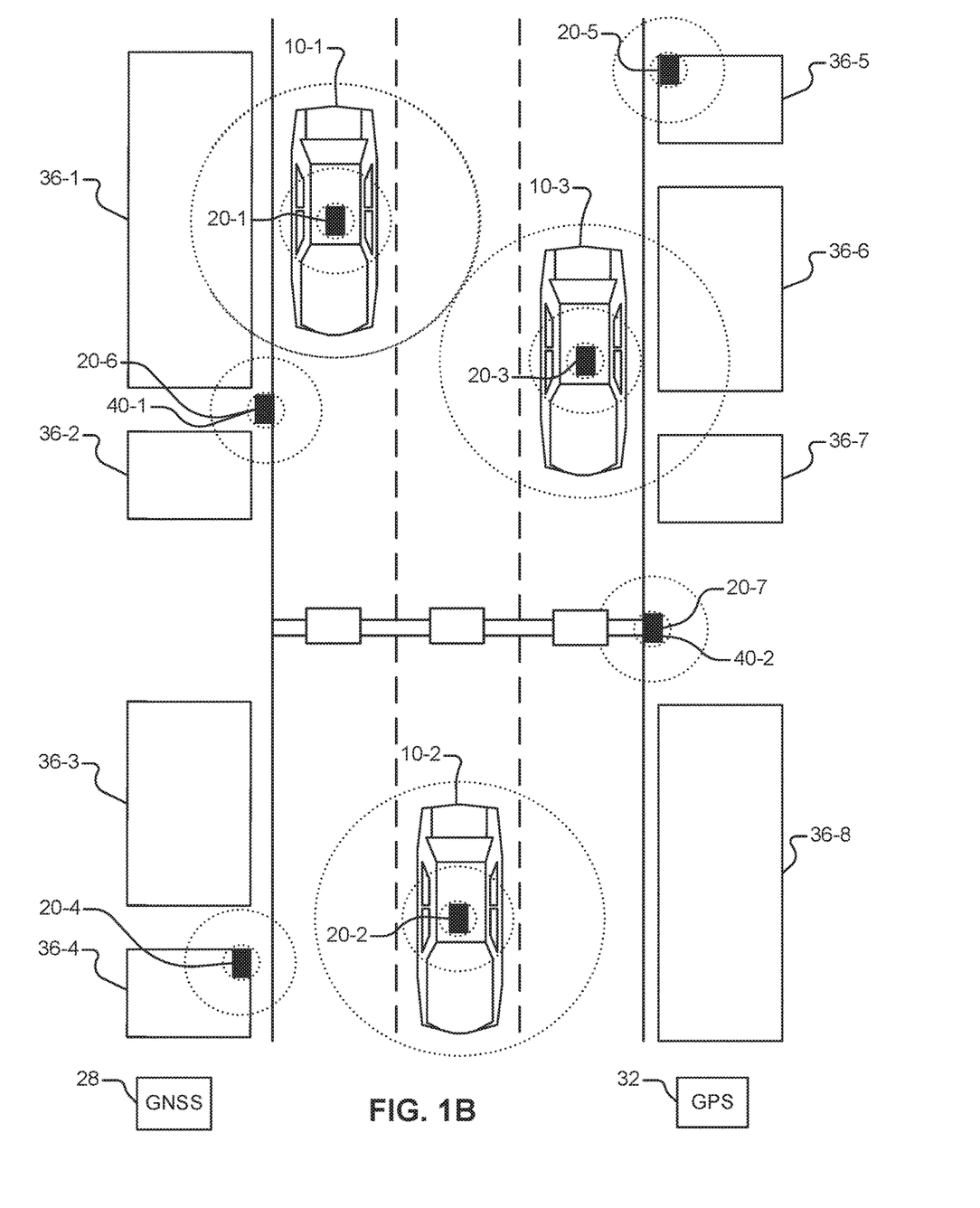
FIG. 1B is an illustration of several vehicles having vehicle communications systems in an urban environment according to the present disclosure.

With reference to FIG. 1B, a plurality of vehicles, infrastructure, and road side equipment (RSE) with V2X safety technology is shown. In the example embodiment, vehicles, or remote vehicles, 10-1, 10-2, 10-3 (collectively referred to as vehicles 10) are respectively equipped with communications systems, for example, DSRC or C-V2X systems, 20-1, 20-2, 20-3 (collectively referred to as vehicle communications systems 20). Infrastructures 36-1, 36-2, . . . , 36-8 (collectively referred to as infrastructures 36) may or may not include communications systems. For example, a portion of infrastructures 36 may include communications, such as DSRC or C-V2X, systems 20-4 and 20-5 (included with the collective vehicle communications systems 20). The communications systems 20 may operate in both line-of-sight (LOS) and non-line-of-sight (NLOS) conditions, thereby allowing the vehicle communications systems 20 of the vehicles 10 and infrastructures 36 to communicate warnings and driving hazards, even with blockage from intervening vehicles, blind corners, or other roadside infrastructure. Signals from each of the vehicle communications systems 20 are illustrated radiating outward in a circular pattern, as indicated by dotted circles in FIG. 1B.

Additionally, road side equipment (RSE) 40-1 and 40-2 (collectively referred to as RSEs 40) may include communications systems, such as DSRC or C-V2X, systems 20-6 and 20-7 (included with the collective vehicle communications systems 20). The communications systems 20 (for example, systems 20-6 and 20-7) may operate in both line-of-sight (LOS) and non-line-of-sight (NLOS) conditions. For example, the system 20-6 and 20-7 of the RSEs 40 may transmit information to vehicles 10 including traffic signal status (SPAT and Map messages) or provide a method for the V2X onboard equipment (OBE) to communicate to servers on the Internet. In the latter scenario, the RSE may transmit WAVE Service Advertisement (WSA) messages to advertise Internet Protocol version 6 (IPv6) connectivity, and the OBE may establish an IPv6 connection to the desired server (for example, the Security Credential Management System, SCMS) on the Internet. Signals from each of the vehicle communications systems 20 are illustrated radiating outward in a circular pattern, as indicated by dotted circles in FIG. 1B.

Figure 2:
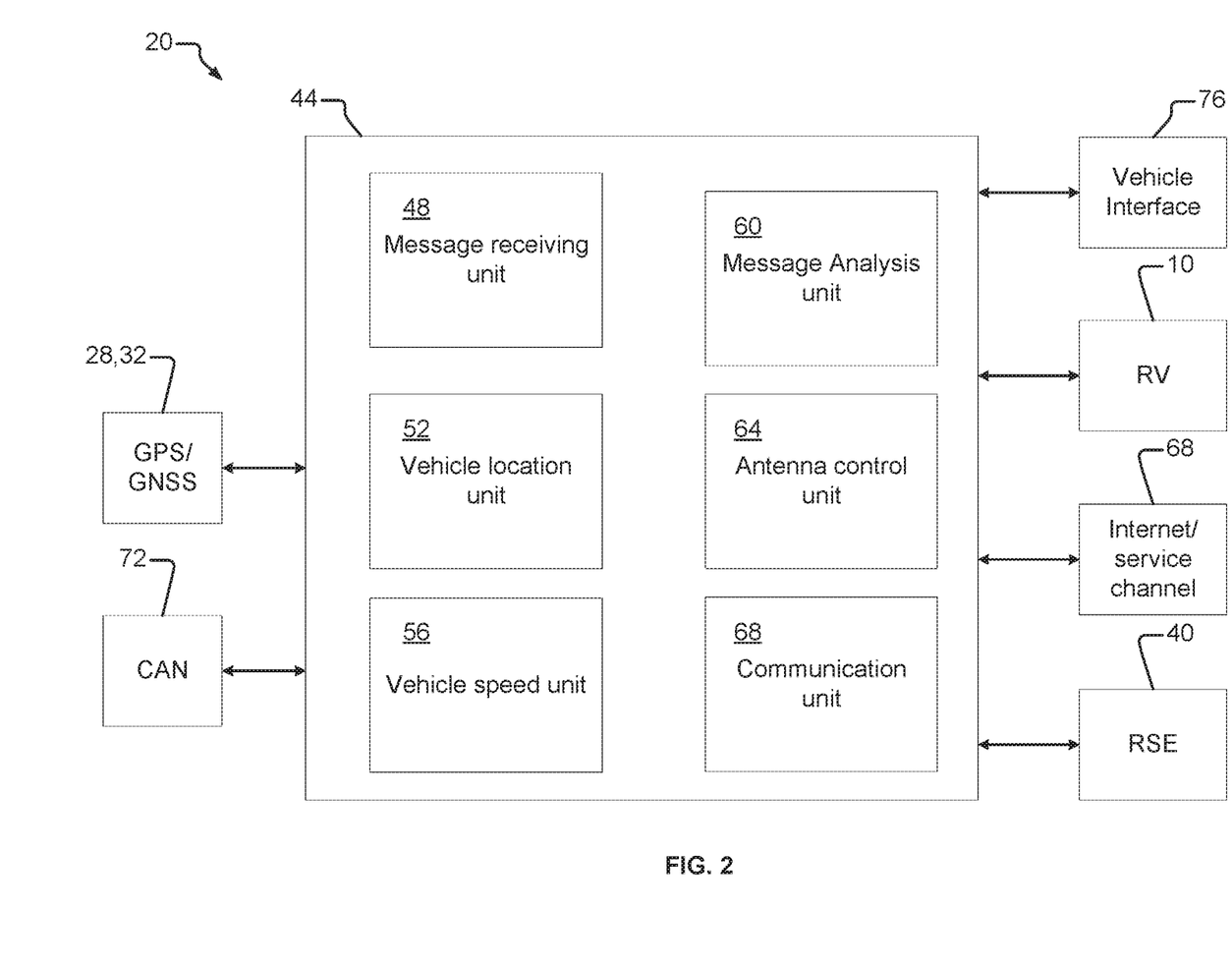
FIG. 2 is a block diagram of an intelligent antenna system according to the present teachings.

Now referring to FIG. 2, a block diagram for the vehicle communications system 20 is illustrated. The vehicle communication system 20 includes a control system, or controller, 44. The control system 44 may further include a message receiving unit 48, a vehicle location unit 52, a vehicle speed unit 56, a message analysis unit 60, an antenna control unit 64, and a communications unit 68. In this application, the term "module" or "unit" may be replaced with the term "circuit." The term "module" or "unit" may refer to, be part of, or include processor hardware (shared, dedicated, or group) that executes code and memory hardware (shared, dedicated, or group) that stores code executed by the processor hardware. The code is configured to provide the features of the modules described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The message receiving unit 48 may communicate with remote vehicles, infrastructure, and/or RSEs to receive messages through the antenna(s) 24. The message receiving unit 48 may classify the messages as BSMs, warnings, driving hazards, SPAT messages, Map messages, WAVE Service Advertisement (WSA) messages, etc. The message receiving unit 48 may classify the messages, for example, by the content of the messages or by information listed in a heading of the messages.

The vehicle location unit 52 may determine the current location of the vehicle 10. For example, the vehicle location unit 52 may communicate with the GPS system 28, or GNSS system 32 by way of the antenna 24 to determine the vehicle's current position. The vehicle location unit 52 may also plot the current location of the vehicle 10 on a map stored within the controller 44.

The vehicle speed unit 56 may determine the vehicle's current speed. For example the vehicle speed unit 56 may determine the current speed from a speedometer. The information from the speedometer may be transmitted to the vehicle speed unit 56 through a communication area network (CAN) system 72 or other communications network.

The message analysis unit 60 may be in communication with the message receiving unit 48 and may analyze the messages received and classified by the message receiving unit 48. For example, the message analysis unit 60 may determine whether a WSA message is of interest. For example, the RSE 40 may transmit WSAs over a safety channel (to which at least one of the radios 26 is tuned). The WSA's contents may provide information about other services being offered on alternate service channels (either DSRC or cellular based). For example, other services may include data transfer services, software upgrades, communications with SCMS, etc. In some embodiments, the controller 44 may continuously update a list of categories of interest based on current needs. The message analysis unit 60 may scan the WSA to determine which services are offered on the alternative channels.

The message analysis unit 60 may also determine whether the communications system 20 is in need of any of the other services being offered. For example, the message analysis unit 60 may scan the controller 44 to determine whether any data should be transferred (for example, if a storage or memory is at least 75% full). The message analysis unit 60 may also compare the current software levels with the newest software levels in the WSA. If the current software levels are lower than the newest software levels, the difference may indicate a need for a software upgrade. The message analysis unit 60 may further scan the controller 44 to determine a number of valid security certificates remaining. If a communications system 20 does not have any valid security certificates, the communications system 20 is not able to transmit any BSMs or perform any V2V safety activities. Thus, if the number of valid security certificates is less than a preset threshold (for example, 4 weeks or less of valid certificates), the message analysis unit 60 may determine that the communications system 20 is in need of additional valid security certificates.

The message analysis unit 60, the vehicle location unit 52, and the vehicle speed unit 56 may be in communication with the antenna control unit 64. The antenna control unit 64 may control the enablement (i.e., may enable and disable) of the antenna diversity for each radio 26 based on the information provided. For example, the antenna control unit 64 may compare the vehicle speed with a speed threshold. If the vehicle speed is greater than the threshold, the antenna control unit 64 may set antenna diversity for a first radio 26 to a high priority. For example, the speed threshold may be set to 40 miles per hour (mph).

Additionally, the antenna control unit 64 may determine whether the vehicle location is safe. The antenna control unit 64 may analyze the current location (or position) of the vehicle 10 and the available map data to determine the safety. For example, the controller 44 may store vehicle incident statistics, such as accident statistics, population numbers, vehicle congestion statistics, etc., for various areas. If the vehicle incident statistics for the current location indicate incidents above a preset threshold (for example, if the reportable crash rate is higher than 1 accident per hour), a population greater than a preset threshold (for example, 100,000 people), or a vehicle congestion statistic rate greater than a preset threshold (for example, an average of more than 80 vehicle in a one mile stretch from the current location for the current time), the antenna control unit 64 may indicate that the location is not safe. In an unsafe location, the antenna control unit 64 may enable antenna diversity for the first radio 26. In instances where the antenna control unit 64 indicates a safe location (i.e., where the parameters are not greater than the preset thresholds), the antenna control unit 64 may disable antenna diversity for the first radio 26 and designate one antenna for each radio 26 such that one antenna 24 transmits over the safety channel and another antenna 24 transmits over a different channel (such as a service channel).

Further, the antenna control unit 64 may control the antenna diversity based on whether the WSA is of interest (i.e., whether the communications system 20 is in need of any of the other services being offered). The determination of whether the WSA is of interest may be performed by the message analysis unit 60 and communicated to the antenna control unit 64. In some cases, if the WSA is of interest, the antenna control unit 64 may disable antenna diversity for the first radio 26 and designate one antenna for each radio 26 such that one antenna 24 transmits over the safety channel and another antenna 24 transmits over a different channel (such as a service channel). If the WSA is not of interest, the antenna control unit 64 may set the antenna diversity for the first radio 26 to high priority.

In other cases, the antenna control unit 64 may set different priorities based on the type of service. If there is no need for the particular service, the antenna control unit 64 may set the antenna diversity for the first radio 26 to high priority. If there is a need to upload files or probe data to a server, the antenna control unit 64 may set a low priority. If there is a need to communicate with a SCMS, the antenna control unit 64 may set a high priority. If there is a need to perform a software upgrade, the antenna control unit 64 may set the priority based on a criticality of the software upgrade. For example only, a map upgrade or satellite radio channel upgrade may receive a low priority, a non-safety-critical system (such as heating, ventilation, and air-conditioning HVAC, heated/cooled seats, etc.) may receive a medium priority, and a safety-critical system (such as steering, braking, and engine-control) upgrade may receive a high priority.

Enablement of antenna diversity for the first radio may be the maximum value for V2V safety, and data transfer between the vehicle communication system 20 and infrastructure is not possible in this mode unless performed using the first radio. Disabling antenna diversity for the first radio and designating each antenna to be used independently for each radio (i.e., the first radio and the second radio) may have moderate benefit for V2V safety, while allowing for data transfer between the vehicle communication system 20 and infrastructure. Enabling antenna diversity for the second radio can only be used in cases in which V2V safety is completely disable and it is critical that the vehicle communication system 20 communicates to the infrastructure, without having to receive any messages on the first radio.

The communication unit 68 may communicate with a vehicle interface 76 (or driver interface), a remote vehicle 10, the internet or service channel 68, or an RSE 40 to transmit messages from the vehicle communication system 20. For example, the communication unit 68 may transmit BSMs, files, data, or other communications to the remote vehicle 10, a server, the RSE 40, the SCMS, etc. The communication unit 68 may transmit the various messages based on the antenna diversity commands from the antenna control unit 64.

Figure 3:
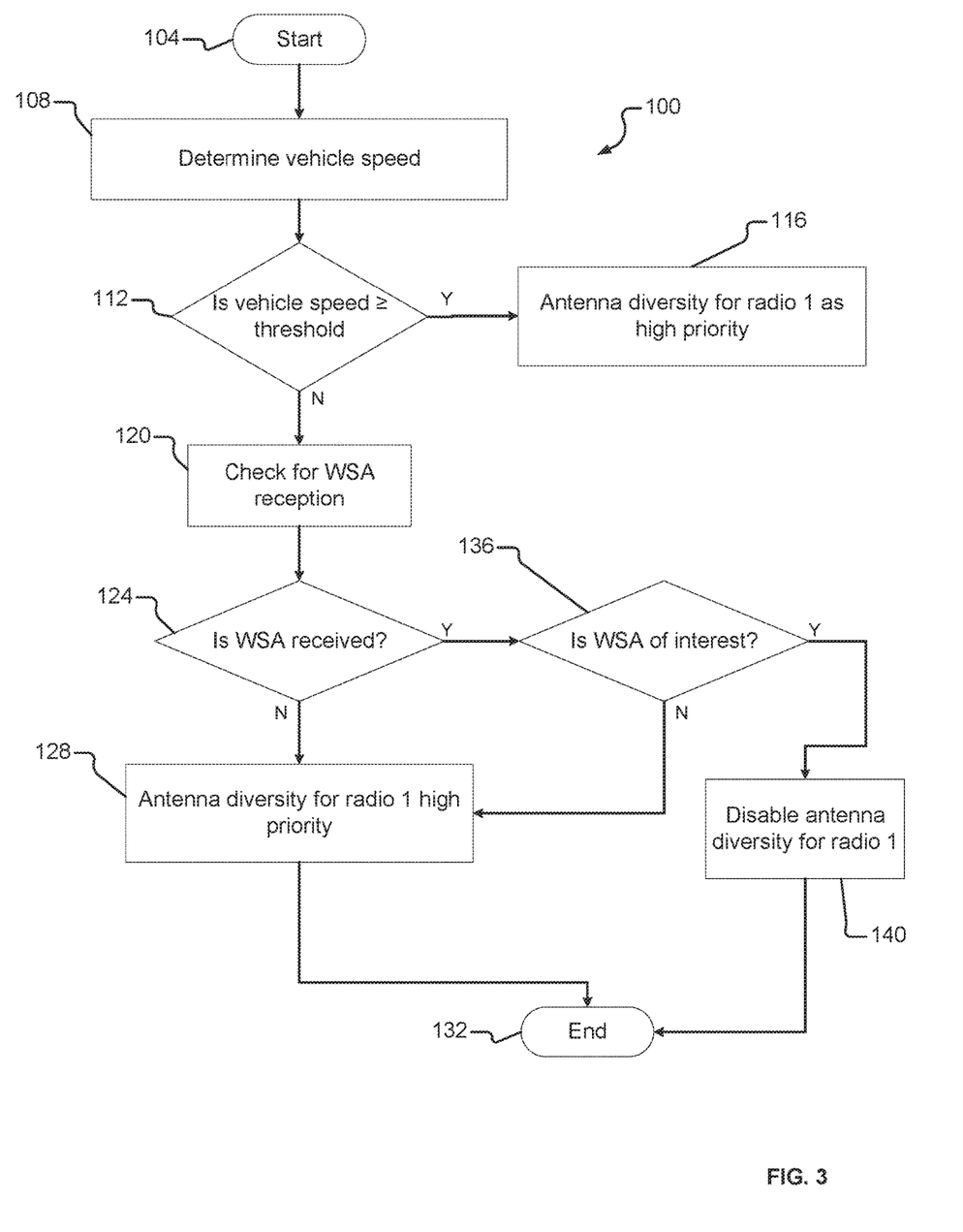
FIG. 3 is a flow chart for a method for allocating antennas according to vehicle speed.

Now referring to FIG. 3, an example method 100 for allocating antennas according to vehicle speed is illustrated. Method 100 starts at 104. At 108, the vehicle speed is determined. For example, the controller 44 may determine vehicle speed from one or more various sensors (wheel speed sensor, etc.) or from the speedometer on the vehicle transmitted through the CAN system 72 (or other communications network).

At 112, the method 100 determines whether the vehicle speed is greater than a threshold. For example, the speed threshold may be set to 40 miles per hour (mph). If true, the antenna diversity for a first radio may be set to high priority at 116. As previously stated, enablement of antenna diversity for the first radio may be the maximum value for V2V safety, and data transfer between the vehicle communication system 20 and infrastructure is not possible in this mode unless performed using the first radio.

If false at 112, the method 100 checks for WSA reception at 120. An RSE may transmit WAVE Service Advertisement (WSA) messages over a safety channel (to which at least one of the radios 26 is tuned) to advertise internet connectivity or other services being offered on alternate service channels (either DSRC or cellular based). For example, other services may include data transfer services, software upgrades, communications with SCMS, etc. The controller 44 may scan the WSA to determine which services are offered on the alternative channels and determined if any of the services are needed.

At 124, the method determines whether a WSA has been received. If false, the antenna diversity for the first radio is set to high priority at 128. The method 100 then ends at 132.

If true at 124, the method 100 determines whether the WSA is of interest at 136. For example, the controller 44 may determine whether any data should be transferred (for example, if a storage or memory is at least 75% full). The controller 44 may also compare the current software levels with the newest software levels in the WSA. If the current software levels are lower than the newest software levels, the difference may indicate a need for a software upgrade. The controller 44 may further determine a number of valid security certificates remaining. If a communications system 20 does not have any valid security certificates, the communications system 20 is not able to transmit any BSMs or perform any V2V safety activities. Thus, if the number of valid security certificates is less than a preset threshold (for example, 4 weeks or less of valid certificates), the controller 44 may determine that the communications system 20 is in need of additional valid security certificates.

If false, the antenna diversity for the first radio is set to high priority at 128, and the method 100 ends at 132. If true at 136, the antenna diversity for the first radio 26 may be disabled and one antenna for each radio 26 may be designated such that one antenna 24 transmits over the safety channel and another antenna 24 transmits over a different channel (such as a service channel) at 140. As previously stated, disabling antenna diversity for the first radio and designating each antenna to be used independently for each radio (i.e., the first radio and the second radio) may have moderate benefit for V2V safety, while allowing for data transfer between the vehicle communication system 20 and infrastructure. The method then ends at 132.

Figure 4:
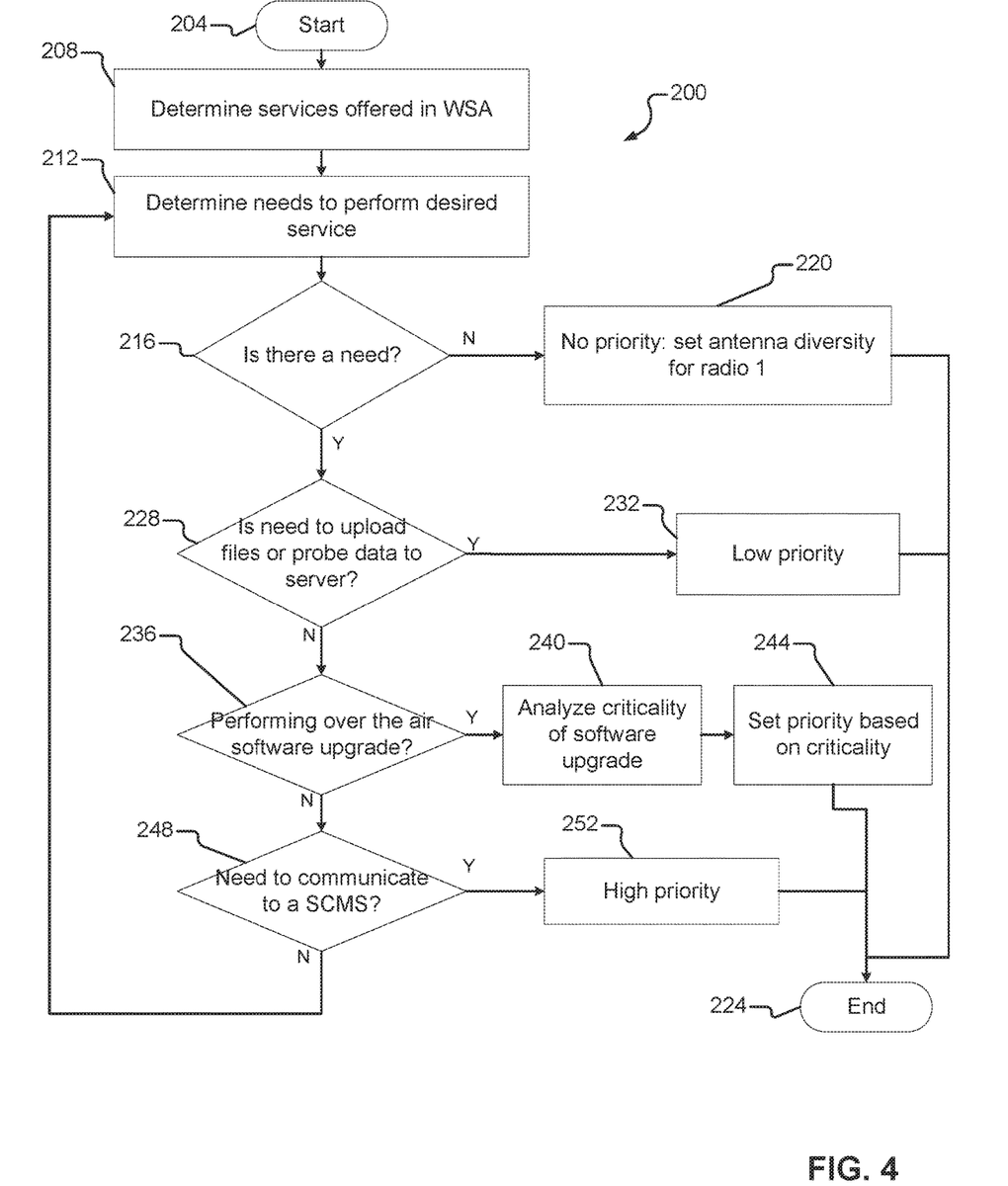
FIG. 4 is a flow chart for a method for allocating antennas according to service priority.

Now referring to FIG. 4, an example method 200 for allocating antennas according to service priority is illustrated. Method 200 begins at 204. At 208, when a WAVE Service Advertisement (WSA) message is received, the services offered may be determined from the content of the WSA. The WSA message's contents may provide information about other services being offered on alternate service channels (either DSRC or cellular based). For example, other services may include data transfer services, software upgrades, communications with SCMS, etc.

At 212, the needs of the vehicle communication system 20 are determined. For example, the controller 44 may determine whether any data should be transferred (for example, if a storage or memory is at least 75% full). The controller 44 may also compare the current software levels with the newest software levels in the WSA, and if the current software levels are lower than the newest software levels, the difference may indicate a need for a software upgrade. The controller 44 may further determine a number of valid security certificates remaining. If a communications system 20 does not have any valid security certificates, the communications system 20 is not able to transmit any BSMs or perform any V2V safety activities. Thus, if the number of valid security certificates is less than a preset threshold (for example, 4 weeks or less of valid certificates), the controller 44 may determine that the communications system 20 is in need of additional valid security certificates.

At 216, the method 200 determines whether there is a need for a service offered in the WSA. For example, the controller 44 may compare the services offered from step 208 with the services needed from step 212. If false, the antenna diversity may be enabled for a first radio at 220. As previously stated, enablement of antenna diversity for the first radio may be the maximum value for V2V safety, and data transfer between the vehicle communication system 20 and infrastructure is not possible in this mode unless performed using the first radio. The method then ends at 224

If true at 216, the method 200 determines whether the need is to upload files or probe data to a server at 228. If true, a low priority for disabling antenna diversity may be set at 232. A low priority may require other conditions to be met (for example, vehicle speed, vehicle safety) before disabling antenna diversity. The method then ends at 224.

If false at 228, the method 200 determines whether the need is for an over-the-air software upgrade at 236. Over-the-air software upgrades allow vehicle manufacturers or other authorized parties to upgrade the vehicle's software remotely. If true, the method 200 analyzes the criticality of the software upgrade at 240. For example, an accessories upgrade, such as a map upgrade, or an upgrade to add satellite radio channels may be considered a low criticality upgrade. A non-safety system update, such as an HVAC system or heated/cooled seats system, may be considered a medium criticality upgrade. A safety system update, such as steering, braking, and engine-control systems, may be considered a high criticality upgrade.

At 244, the priority for disabling antenna diversity may be set based on the criticality of the software upgrade. For example only, a low criticality upgrade may receive a low priority, a medium criticality upgrade may receive a medium priority, and a high criticality upgrade may receive a high priority. The method then ends at 244.

If false at 236, the method 200 determines whether the need is to communicate to a Security Credential Management System (SCMS) at 236. If false, method 200 returns to 212. Returning to 248, if a communications system 20 does not have any valid security certificates, the communications system 20 is not able to transmit any BSMs or perform any V2V safety activities. Accordingly, if true at 248, the priority for disabling antenna diversity may be set to a high priority at 252. The method then ends at 224.

Figure 5:
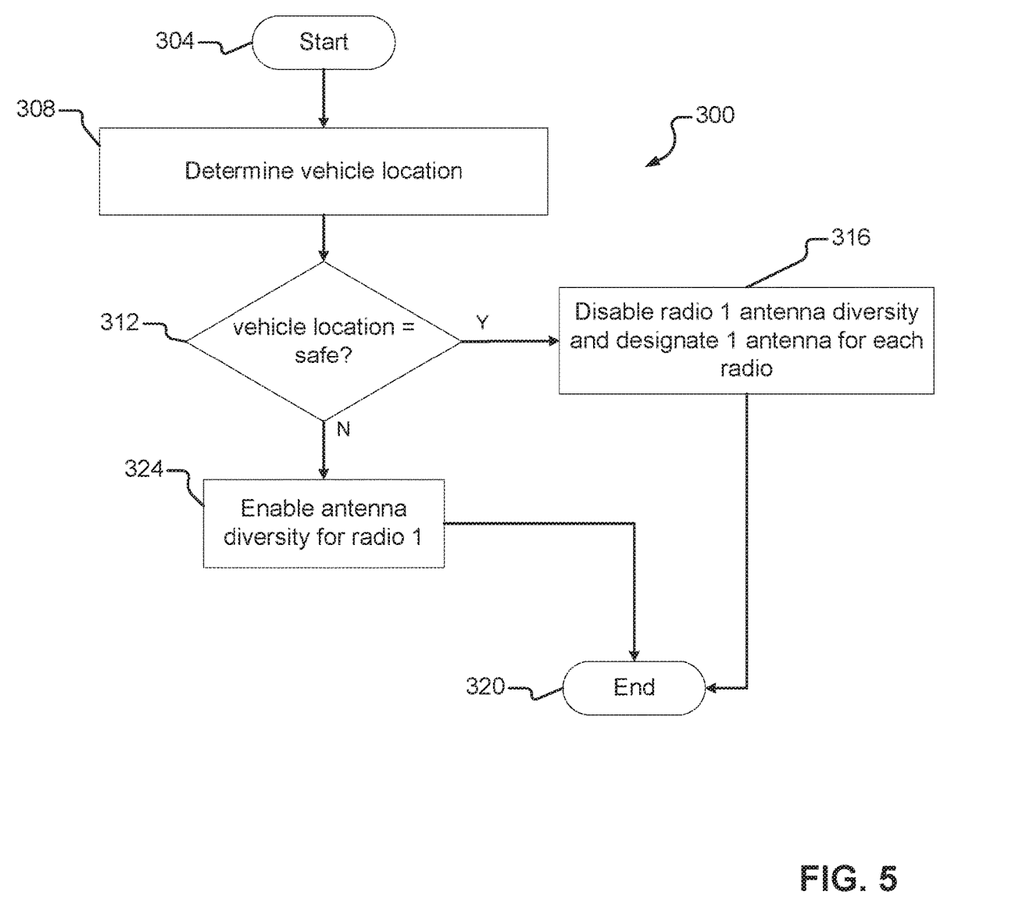
FIG. 5 is a flow chart for a method for allocating antennas according to vehicle location.

Now referring to FIG. 5, an example method 300 for allocating antennas according to vehicle location is illustrated. Method 300 begins at 304. At 308, the current vehicle location is determined. For example, the controller 44 may communicate with the GPS system 28, or GNSS system 32 by way of the antenna 24 to determine the vehicle's current position. The controller 44 may also plot the current location of the vehicle 10 on a map.

At 312, the safety of the current vehicle location is determined. The controller 44 may analyze the current location (or position) of the vehicle 10 and the available map data to determine the safety. For example, the controller 44 may store vehicle incident statistics, such as accident statistics, population numbers, vehicle congestion statistics, etc., for various areas. If the vehicle incident statistics for the current location indicate incidents above a preset threshold (for example, if the reportable crash rate is higher than 1 accident per hour), a population greater than a preset threshold (for example, 100,000 people), or a vehicle congestion statistic rate greater than a preset threshold (for example, an average of more than 80 vehicle in a one mile stretch from the current location for the current time), the antenna control unit 64 may indicate that the location is not safe.

If true at 312, the antenna diversity for the first radio 26 may be disabled and one antenna for each radio 26 may be designated such that one antenna 24 transmits over the safety channel and another antenna 24 transmits over a different channel (such as a service channel) at 316. As previously stated, disabling antenna diversity for the first radio and designating each antenna to be used independently for each radio (i.e., the first radio and the second radio) may have moderate benefit for V2V safety, while allowing for data transfer between the vehicle communication system 20 and infrastructure. The method then ends at 320.

If false at 312, the antenna diversity for the first radio may be enabled at 324. As previously stated, enablement of antenna diversity for the first radio may be the maximum value for V2V safety, and data transfer between the vehicle communication system 20 and infrastructure is not possible in this mode unless performed using the first radio. The method then ends at 320.

Figure 6:
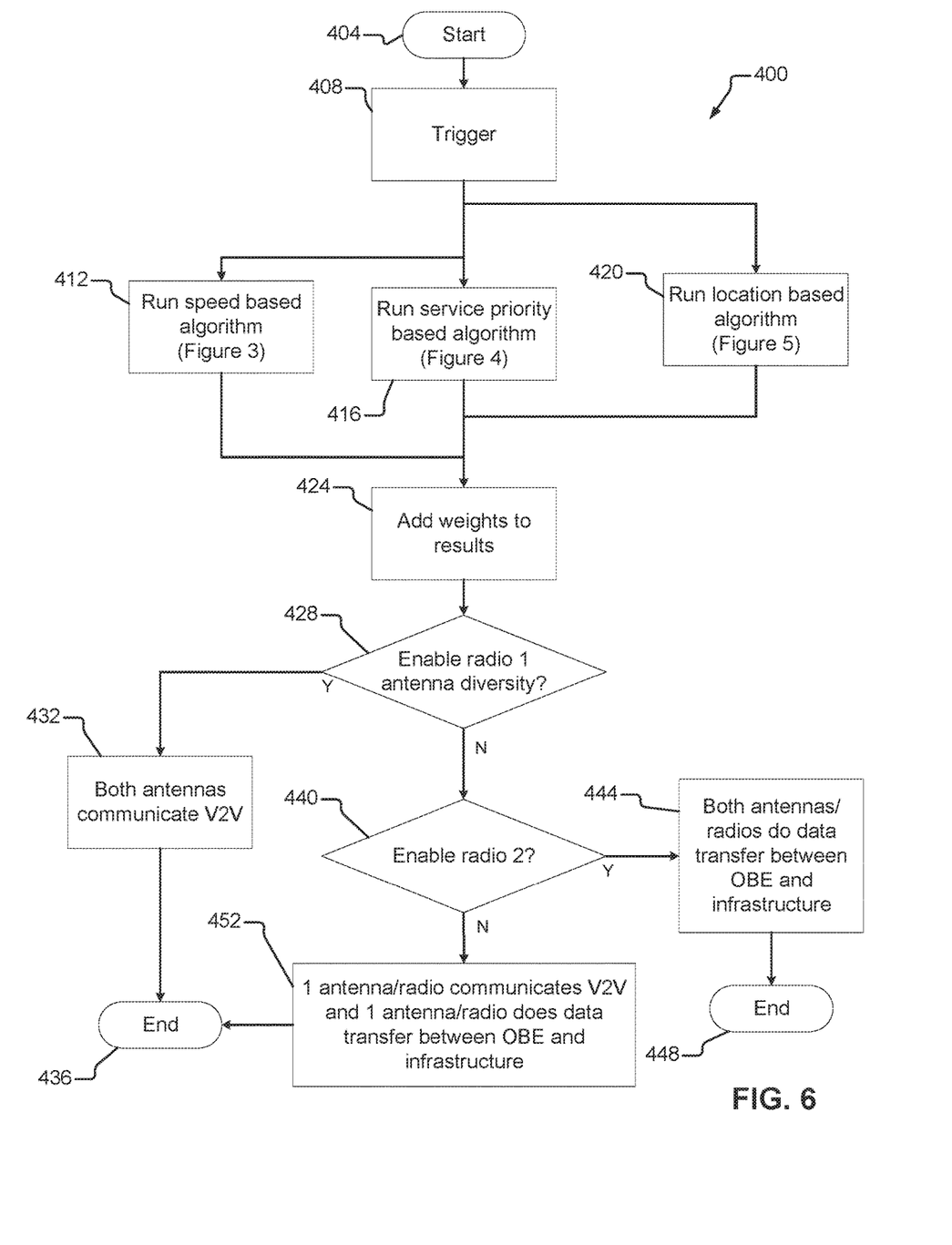
FIG. 6 is a flow chart for a method for allocating antennas incorporating the methods in FIGS. 3-5.

Now referring to FIG. 6, an example method 400 allocating antennas incorporating the methods in FIGS. 3-5 is illustrated. Method 400 begins at 404. At 408, a trigger begins the process. For example, the trigger may be receipt of a WSA message by the first radio on the safety channel. At 412, the speed-based process in FIG. 3 is executed. At 416, the service priority based process in FIG. 4 is executed. At 420, the run-location-based process in FIG. 5 is executed. The processes in FIGS. 3-5 may be executed concurrently.

At 424, weights are added to the results. For example, the speed-based results may be considered more important than the location-based results and would therefore be weighted greater than the location-based results. Thus, in some embodiments, the speed-based results may be multiplied by a factor of 1.5-2.5. Further, the service-priority-based results may be considered more important than the location-based results and would therefore be weighted greater than the location-based results. Thus, in some embodiments, the service-priority-based results may be multiplied by a factor of 2.5-3.5.

At 428, method 400 determines whether to enable antenna diversity for the first radio. The determination may be determined based on the weighted results of step 424. If true, both antennas communicate V2V at 432. The method 400 then ends at 436.

If false at 428, method 400 determines whether to enable the second radio at 440. The determination may be determined based on the weighted results of step 424. For example, if there is a need to communicate with SCMS, the second radio may be enabled. If true, both antennas and radios perform data transfer between the vehicle communication system 20 and the RSE 40 or other infrastructure at 444. As previously stated, this configuration may only be used in circumstances in which V2V safety is completely disabled and it is critical that the vehicle communication system 20 communicates with the infrastructure, without having to receive any messages on the first radio (for example, V2V safety messages or BSMs). The method then ends at 448.

If false at 440, one antenna/radio communicates V2V and one antenna/radio performs data transfer between the vehicle communications system 20 and the RSE 40 or other infrastructure at 452. As previously stated, this configuration has moderate benefit for V2V safety, while also allowing for data transfer between the vehicle communications system 20 and the RSE 40 or other infrastructure. The method then ends at 436.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle communications system comprising:
a pair of antennas;
a radio; and
a controller configured to enable and disable antenna diversity between communication over a safety channel and communication over a service channel, the controller being further configured to compare a vehicle speed with a threshold, identify a WAVE Service Advertisement message, analyze the WAVE Service Advertisement message for content, determine whether the content of the WAVE Service Advertisement message offers a needed service, assign a service priority based on the content of the WAVE Service Advertisement message, determine a vehicle location, add weights to the service priority, vehicle location, and vehicle speed, and selectively disable antenna diversity based on a weighted comparison of the service priority, vehicle location, and vehicle speed, wherein the weight of the service priority is multiplied by a factor within a range of 2.5 to 3.5, the weight of the vehicle location is multiplied by a factor of 1, and the weight of the vehicle speed is multiplied by a factor of within a range of 1.5 to 2.5.

2. The system of claim 1, wherein the controller is configured to transfer data over the service channel to a server.

3. The system of claim 1, wherein the controller is configured to communicate with an infrastructure over the service channel.

4. The system of claim 1, wherein the controller is configured to communicate with a remote vehicle over the safety channel.

5. The system of claim 1, wherein the controller is configured to determine whether a vehicle speed is greater than a threshold and to enable antenna diversity for the radio if the vehicle speed is greater than the threshold.

6. The system of claim 1, wherein when antenna diversity is enabled, the radio is restricted to communication over the safety channel.

7. The system of claim 1, wherein when antenna diversity is disabled, one of the pair of antennas communicates over the safety channel and one of the pair of antennas communicates over the service channel.

8. The system of claim 1, further comprising a second radio, wherein when antenna diversity is disabled a first of the pair of antennas and the radio communicate over the safety channel and a second of the pair of antennas and the second radio communicate over the service channel.

9. A method for vehicle communication comprising:
determining, by a controller, current vehicle conditions;
enabling and disabling, by the controller, antenna diversity for a radio between communication over a safety channel and communication over a service channel based on the current vehicle conditions;
comparing, by the controller, a vehicle speed with a threshold;
identifying, by the controller, a WAVE Service Advertisement message
analyzing, by the controller, content of the WAVE Service Advertisement message;
determining, by the controller, whether the content of the WAVE Service Advertisement message offers a needed service;
assigning, by the controller, a service priority based on the content of the WAVE Service Advertisement message;
determining, by the controller, a vehicle location,
adding, by the controller, weights to the service priority, vehicle location, and vehicle speed, wherein the weight of the service priority is multiplied by a factor within a range of 2.5 to 3.5, the weight of the vehicle location is multiplied by a factor of 1, and the weight of the vehicle speed is multiplied by a factor of within a range of 1.5 to 2.5; and
selectively disabling, by the controller, antenna diversity based on a weighted comparison of the service priority, vehicle location, and vehicle speed.

10. The method of claim 9, further comprising transferring, by the controller, data over the service channel to a server.

11. The method of claim 9, further comprising communicating, by the controller, with an infrastructure over the service channel.

12. The method of claim 9, further comprising communicating, by the controller, with a remote vehicle over the safety channel.

13. The method of claim 9, further comprising determining, by the controller, whether a vehicle speed is greater than a threshold; and enabling, by the controller, antenna diversity for the radio if the vehicle speed is greater than the threshold.

14. The method of claim 9, restricting, by the controller, the radio to communication over the safety channel when antenna diversity is enabled.

15. The method of claim 9, configuring, by the controller, a first antenna to communicate over the safety channel and a second antenna to communicate over the service channel when antenna diversity is disabled.

16. The method of claim 9, configuring, by the controller, a first antenna and the radio to communicate over the safety channel and a second antenna and a second radio to communicate over the service channel when antenna diversity is disabled.

* * * * *

UNITED STATES PATENT AND TRADEMARK OFFICE
CERTIFICATE OF CORRECTION

PATENT NO. : 10,771,119 B2
APPLICATION NO. : 16/134370
DATED : September 8, 2020
INVENTOR(S) : Aaron Weinfield Page 1 of 1

It is certified that error appears in the above-identified patent and that said Letters Patent is hereby corrected as shown below:

In the Claims

Column 16, Line 12: In Claim 9, after "message", insert --;--

Signed and Sealed this
Tenth Day of November, 2020

Andrei Iancu
*Director of the United States Patent and Trademark Office*